United States Patent [19]

Aubin

[11] Patent Number: 5,456,139
[45] Date of Patent: Oct. 10, 1995

[54] TOOTH PROFILE ARRANGEMENT TO ELIMINATE TOOTH INTERERENCE IN EXTENDED CONTACT HARMONIC DRIVE DEVICES

[75] Inventor: Joseph J. Aubin, Georgetown, Mass.

[73] Assignee: Teppin Seiki Boston, Inc., Peabody, Mass.

[21] Appl. No.: 113,285

[22] Filed: Aug. 30, 1993

[51] Int. Cl.$^6$ .................................................. F16H 1/32
[52] U.S. Cl. ............................................. 74/640; 74/462
[58] Field of Search ...................................... 74/640, 462

[56] References Cited

U.S. PATENT DOCUMENTS

| | | | |
|---|---|---|---|
| 2,128,125 | 8/1938 | Guest | 74/640 |
| 2,906,143 | 9/1959 | Musser | 74/640 |
| 3,415,143 | 12/1968 | Ishikawa | 74/640 |
| 3,996,816 | 12/1976 | Brighton | 74/640 |
| 4,051,745 | 10/1977 | Ishikawa | 74/640 |
| 4,823,638 | 4/1989 | Ishikawa | 74/640 |

FOREIGN PATENT DOCUMENTS

| | | |
|---|---|---|
| 2203233 | 2/1973 | Germany . |
| 401083972 | 3/1987 | Japan ................................. 74/640 |
| 0309197 | 3/1989 | Japan . |
| 0501522 | 9/1992 | Japan . |
| 405172196 | 7/1993 | Japan ................................. 74/640 |
| 405209655 | 8/1993 | Japan ................................. 74/640 |

OTHER PUBLICATIONS

Konstruktion, vol. 42, No. 7/8, 1990 Berlin DE pp. 255–260, XPO 001 95082 F. Leistner.
Konstruktion, vol. 43, No. 7/8, 1991 Berlin DE pp. 275–280, S. Motyka.

*Primary Examiner*—Khoi O. Ta
*Attorney, Agent, or Firm*—Don Halgren

[57] ABSTRACT

The present invention comprises an extended tooth contact harmonic drive gearing apparatus for transmitting rotary motion from an input drive to an output drive through mating contact between a flexspline and a rigid circular spline, the flexspline being swept into a non-circular shape by a wave generator. The wave generator causes the teeth of the flexspline to precess from a normal to an inclined orientation and back to a normal orientation again. The teeth on both the flexspline and the circular spline have a profile which accomodates that tooth inclination, and thus avoids interference therebetween.

2 Claims, 5 Drawing Sheets

TOOTH PROFILE ARRANGEMENT TO ELIMINATE TOOTH INTERERENCE IN EXTENDED CONTACT HARMONIC DRIVE DEVICES

BACKGROUND OF THE INVENTION (1) Field of the Invention

This invention relates to strain wave gearing, and more particularly to an improved tooth profiles of a flexspline and a circular spline in harmonic drive devices.

(2) Prior Art

The original harmonic drive strain wave gearing was introduced by Musser in U.S. Pat. No. 2,906,143. A harmonic drive strain wave gear comprises a rigid circular spline having "n" teeth, a flexspline having fewer than "n" teeth ("n" being a positive integer) and being disposed in the circular spline, and a rotatable wave generator disposed in the flexspline to deform the flexspline into a lobed configuration, such as an oval shape, so as to force the flexspline into engagement with the circular spline at two points of the major axis of the formed ovaloid. The wave generator may include an oval camplate and a bearing snugly mounted on the outer periphery of the camplate. The outer bearing is matingly inserted into the flexspline so as to deform it to the peripheral contour of the camplate. An input shaft attached to the camplate provides rotation thereto, causing the ovaloid configuration of the flexspline to be correspondingly rotated. During such rotation, the circular spline is induced to rotate relative to the flexspline an amount proportional to the difference in the number of teeth between the flexspline and the circular spline. When an output shaft is arranged on either the flexspline or the circular spline, that output shaft is rotated very slowly in comparison to its input shaft. Such harmonic drive strain wave gearing has been utilized in machinery requiring a high reduction ratio.

An improvement in tooth design was made by Ishikawa, as shown in U.S. Pat. No. 3,415,143, wherein tooth engagement between the flexspline and the circular spline was deviated so that one face only of a flexspline tooth engages a circular spline tooth, the tooth being of an involute configuration.

Further improvements in harmonic drive tooth profiles appeared in U.S. Pat. No. 3,996,816 to Brighton who designed a modified involute configuration with a small contact angle.

A more recent attempt at a tooth profile redesign is shown in U.S. Pat. No. 4,823,638 to Ishikawa, wherein a tooth profile of the engaging splines is defined by a transformation of an original curve by the application of a reduced ½ scale to a corresponding similar figure, that is, a mapping curve derived by a similarity transformation from the movement locus of the crest of the flexspline relative to the circular spline.

This design, as well as the other aforementioned gear tooth configurations, are based on a simplified traditional rack development.

In fact, the gear teeth are not located on a simple rack. The circular spline teeth are located on a circle and the flexspline teeth are located on an oval surface formed by the wave generator. These two curved surfaces cause an inclination angle change between a tooth on the flexspline relative to the circular spline as the tooth moves into engagement from the minor axis to the major axis. No such inclination angle occurs when it is assumed that the circular spline and the flexspline are straight racks.

There is no appreciation in any of the prior art, for tooth inclination as the flexspline is distorted by the wave generator wiping therepast. The fact that tooth inclination precesses at a maximum angle of 45 degrees in front of and behind each lobe of an oval wave generator is given no consideration in the prior art.

BRIEF SUMMARY OF THE INVENTION

The objects of this invention are achieved by a harmonic drive assembly comprised of a flexspline disposed within a rigid circular spline having opposed teeth in an extended contact arrangement, intermating at spaced apart locations corresponding to the eccentricities of a rotatable oval shaped wave generator disposed within the flexspline, the rotation of which initiates relative motion between the flexspline and the circular spline due to a differing number of gear teeth between the flexspline and the circular spline. The tooth profiles of the flexspline and circular spline are determined, by a mapping curve which includes accommodation for tooth cant or inclination which occurs within the teeth of the flexspline as engagement with the teeth of the circular spline progresses.

The invention thus comprises an extended contact harmonic drive gearing apparatus for transmitting rotary motion from an input drive to an output drive, comprising: a rigid circular spline having gear teeth thereon; a flexible flexspline having gear teeth thereon arranged radially adjacent the rigid circular spline; an oval wave generator having a major axis and a minor axis arranged radially adjacent the circular spline, and adapted to deform the flexspline when rotated, to generate a rotative motion between the flexspline and the circular spline; the flexspline having a minor axis thereacross with maximum radial separation between the gear teeth of the flexspline and the circular spline; the flexspline having a major axis thereacross with a maximum engagement between the gear teeth of the flexspline and the circular spline; the gear teeth on the flexspline having a precessing inclination and back again as they pass from the minor axis to the major axis thereon with respect to the oval shaped wave generator; and the gear teeth on the flexspline and the circular spline having a tooth profile which Accomodates such tooth inclination so as to avoid interference therebetween as they mate. The tooth profile for this extended contact harmonic drive gearing Appartus is defined by the equations: $X=d/8[2\theta-\sin(2\theta)]+\frac{1}{2}\{\mu(\theta) \times h(\theta)\}$; and $Y=d/4[1-\cos(2\theta)]$; where X and Y are the curve coordinates. The invention also comprises a harmonic drive gearing apparatus for transmitting rotary motion from an input drive to an output drive, including a rigid circular spline; a flexible flexspline arranged radially adjacent the circular spline; an oval wave generator arranged radially adjacent the circular spline adapted to deform the flexspline into a corresponding oval shape when rotated, to generate a rotative motion between the flexspline and the circular spline, each of the flexspline and the circular spline having a tooth profile which accommodates tooth inclination of up to about 2 degrees to eliminate tooth interference between enmeshed engaged flexspline and circular spline teeth on a harmonic drive apparatus. The invention includes a method of generating a tooth profile for an extended contact harmonic drive assembly having an oval wave generator having a major axis and a minor axis, a flexspline and a circular spline, which includes the steps of: fabricating a tooth profile on both the mating flexible spline and the circular spline so as to permit full engagement therebetween at a major axis of interengagement of the flexible spline, and no engagement between the teeth at a minor axis of the flexible spline; forming the tooth profile so as to avoid interference between the flexspline and circular spline teeth at any point between the major axis and the minor axis by forming the tooth profile to avoid that interference otherwise incurred due to the tooth inclination at points between the major and minor axis. The method also includes the step of manufacturing the tooth profile so as to allow the inclination of up to 2 degrees for the teeth precessing on the flexspline as the oval shaped wave generator sweeps therepast.

It is therefore an object of the present invention to provide a tooth profile for extended contact flexspline and circular spline gear tooth configurations which take into account such tooth inclination to avoid interference therebetween.

It is a further object of the present invention to provide a tooth profile which permits more tooth contact between the flexspline and the circular spline, to yield higher torsional stiffness characteristics of the assembly.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
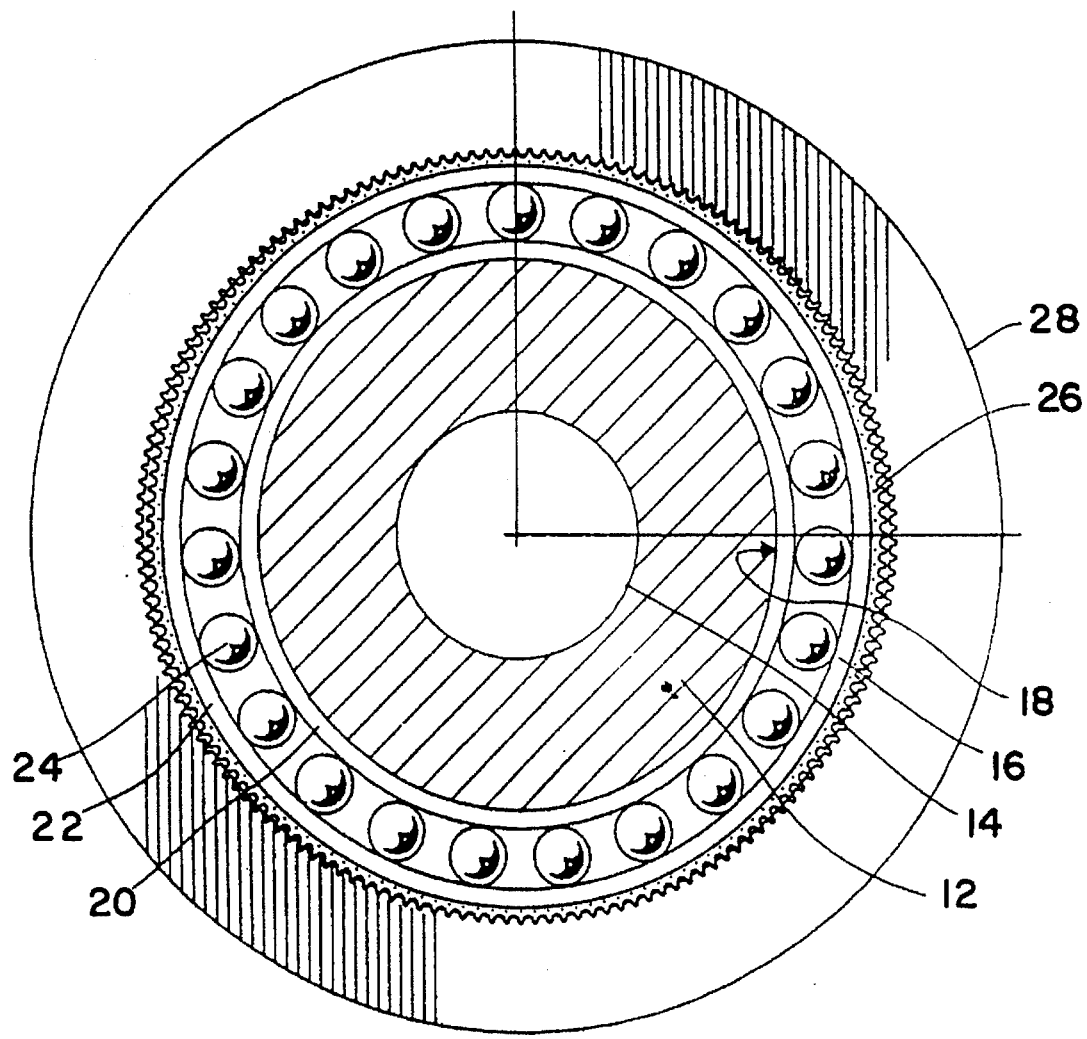
FIG. 1 is a front partial view of a harmonic drive gearing assembly constructed according to the principles of the present invention.

Referring to the drawings, and particularly to FIG. 1, there is shown in an enlarged frontal view, a harmonic drive gearing assembly 10, having a tooth profile which is the subject of the present invention.

The harmonic drive gearing assembly 10 comprises a planar generally oval shaped wave generator (cam plate) 12 having a bore 14 for attachment to a drive shaft, not shown.

The wave generator 12 has an outer periphery 18 with a bearing assembly 16 pressed thereabout. The bearing assembly 16 consists of an inner race 20, an outer race 22, and a plurality of roller members 24 rotatively distributed therebetween. A deformable flexspline 26 is disposed outwardly of and snugly engaged with the outer race 22 of the bearing assembly 16. A rigid circular spline 28 is disposed radially outwardly of the deformable flexspline 26. An array of gear teeth 30 is fabricated on the outer periphery of the flexspline 26, and another array of gear teeth 32 is formed on the inner periphery of the circular spline 28 in a matable relationship therebetween.

Figure 3A:
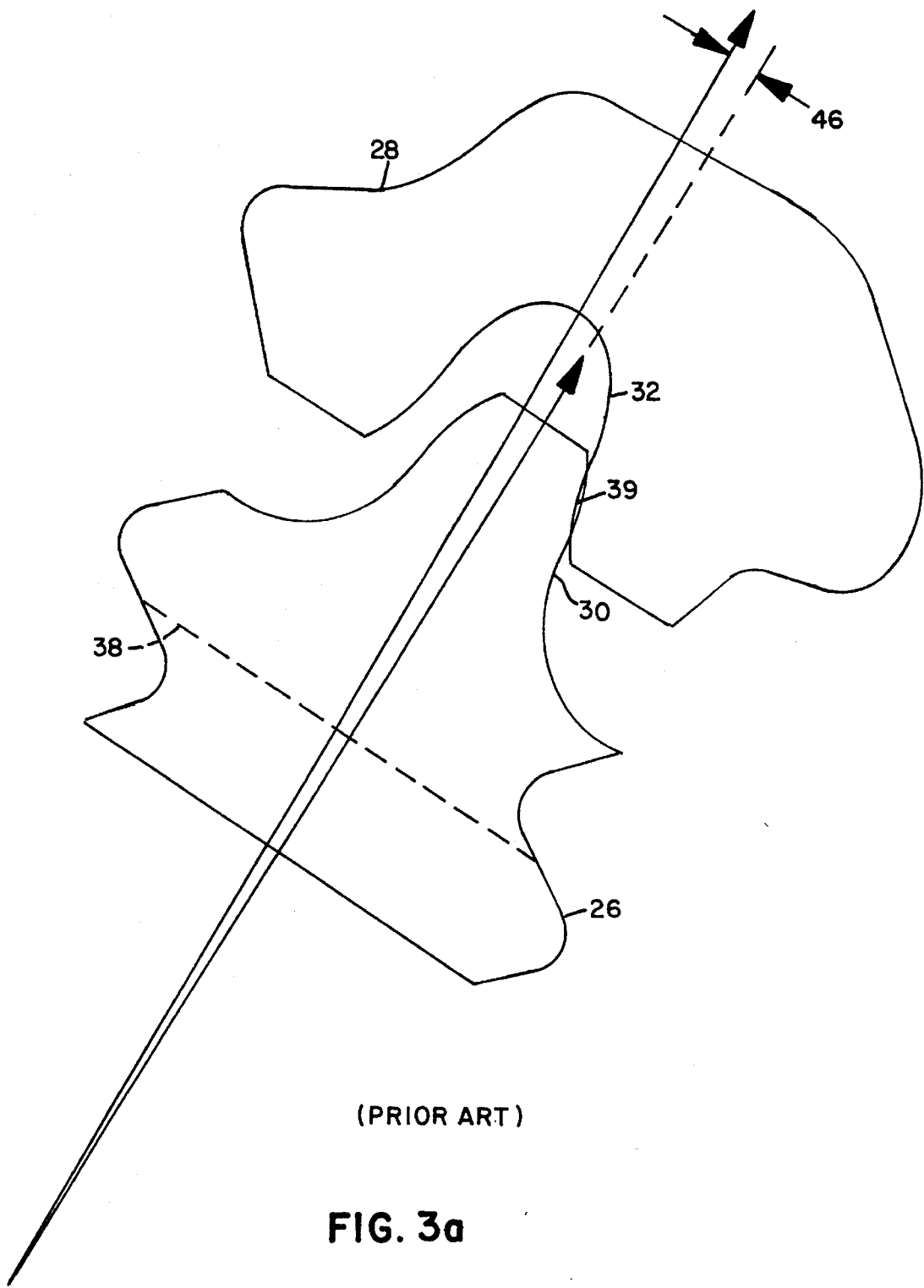
FIG. 3a is a frontal enlarged view of a flexspline tooth engaging a pair of teeth of the circular spline, showing the interference typical of the prior art.
Figure 3B:
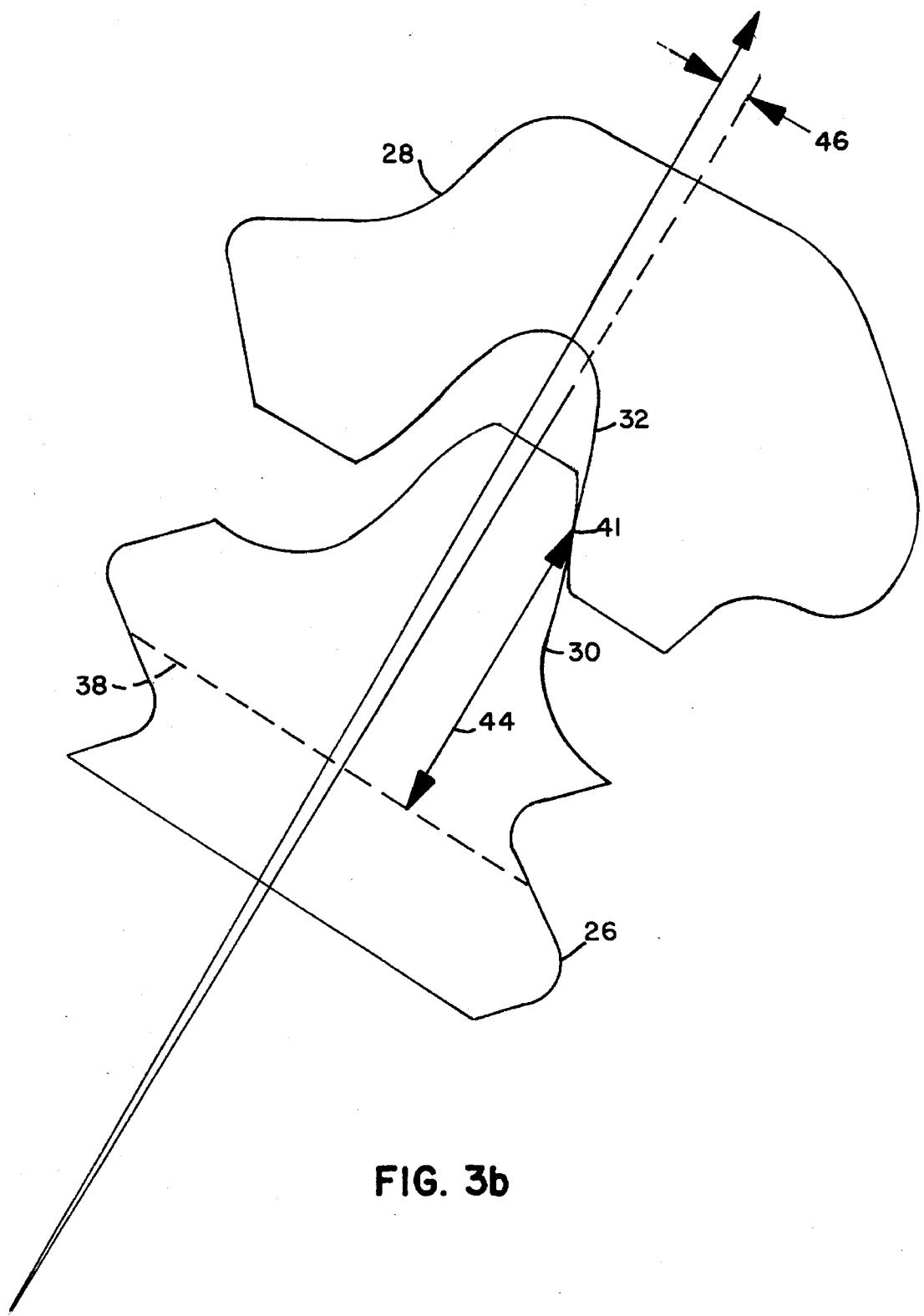
FIG. 3b is a view similar to FIG. 3a, showing the tooth engagement of the present invention.

Tooth inclination consideration of the present invention, is depicted in FIGS. 3a and 3b, in an enlarged representation. The present invention as shown in FIG. 3b, critically includes allowance for tooth inclination in determination of the tooth profile.

The tooth inclination exists when the lobe (which defines the major axis of the wave generator 12) of the wave generator 12 rotates within and adjacent the flexspline 26, to give the flexspline 26 a corresponding oval shape, having a minor axis and a major axis, with teeth on the radially outer side thereof, the "normal" of each tooth thus being canted or inclined during the sweep of the major and minor axes of the wave generator (cam plate) 12 therewithin. At the major axis of the wave generator 12, the inclination of the teeth at the corresponding location on the flexspline 26 thereat, is zero, and likewise with the teeth at a corresponding location on the flexspline 26 at the minor axis.

All flexspline teeth are progressively more inclined, reaching maximum inclination (cant) at a location between the major and minor axis.

Figure 2:
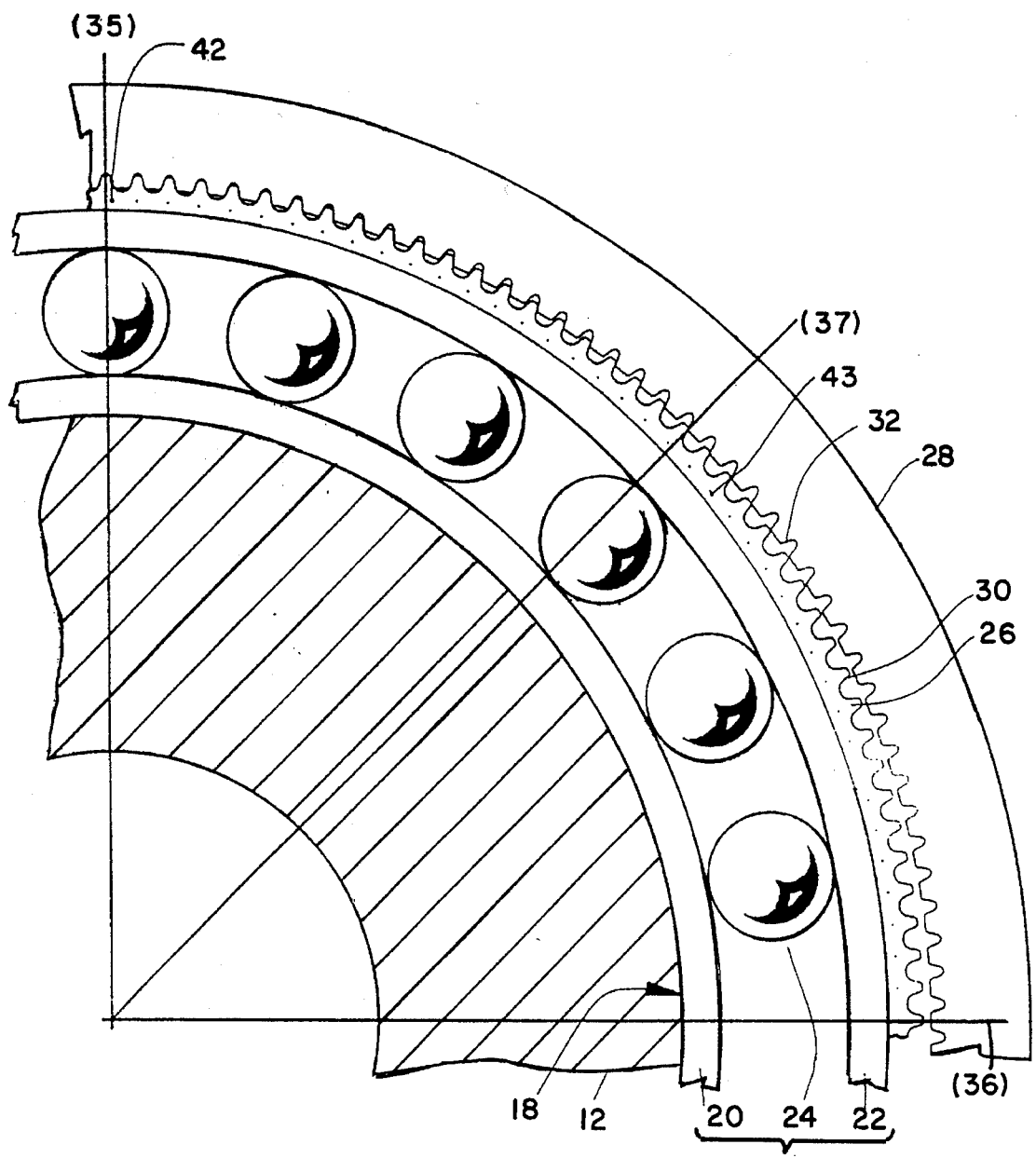
FIG. 2 is a view of a quadrant of the teeth of a flexspline and a circular spline shown in FIG. 1, showing the progressive points of tooth engagement therebetween.

The major axis of the cam plate 12 and the flexspline 26 is represented, in FIG. 2, at the 12 o'clock position (35), and likewise, the minor axis in FIG. 2 is at the 3 o'clock position (36). The maximum inclination of the teeth 30 of the flexspline 26 are found at the mid-point between the major and minor axes 35 and 36.

The contact height (44) "h", is defined as the radial distance from the point of contact on the tooth 30 of the flexspline 26 to a point on the neutral surface 38 of the flexspline 26. The neutral surface 38 is a term describing the surface between the outside diameter (OD) and the inside diameter (ID) of the flexspline 26, (ignoring the teeth). It is assumed that the neutral surface does not change length during the distortion of the flexspline 26.

The minimum "h" occurs when the teeth 30 and 32 are fully engaged, such as at the major axis 35, as shown in FIG. 2.

FIG. 3a shows the location of interference 39 in typical prior art tooth profiles.

In FIG. 3b however, "h" is shown as the distance "44" from the point of contact 41 of the circular spline teeth 32 and the flexspline teeth 30, and the neutral surface 38.

The value of "h" varies from a minimum at the major axis 35 and a maximum at 37 at the onset of tooth engagement, as indicated in FIG. 2, depending upon the geometry of the addendum height.

The contact height equation has the form:

$$h(\theta) = \text{harmonic component(s)} + \text{constant}$$

The harmonic component is due to the wave generator. Our equation for contact height is:

$$h(\theta) = d/4[1 - \cos(2\theta)] + k;$$

Where: "$\theta$" is the rotation angle of the wave generator.

"d" is the amplitude of the deflection of the wave generator and is defined as the difference between the pitch diameters of the circular spline and the flexspline.

"k" is the minimum value of contact height, which is a constant, and is the radial distance from the flexspline's neutral surface to its pitch diameter.

Tooth inclination, as shown in FIG. 3b, results from the flexspline being deformed into an oval shape. The tooth inclination is zero at both the major and minor axis location of the flexspline/wave generator, and reaches a maximum value at 37, or halfway between the major and minor axes.

We assume the flexpline tooth remains perpendicular (normal) to the neutral surface. Then, the angle the tooth inclines, can then be determined from the following trigonometric differential equation:

$$\tan \mu = -1/r \, dr/d\theta$$

For a typical case when the shape of the flexspline is given by:

$$r = r_c + d/2(\cos(2\theta))$$

Solving for the tooth inclination angle gives:

$$\mu(\theta) = \text{ArcTan}\,[1/\{r_c + d/2 \cos(2\theta)\}][-d \sin(2\theta)]$$

Where:

"$\mu$" is tooth inclination angle in radians and

"$r_c$" is the radius of the undeformed flexspline.

Substituting typical values for "d" and "$r_c$" in this equation we find that the maximum value of tooth inclination is in the range of 1 or 2 degrees. When the tooth profile is described by:

$$X = d/8[2\theta - \sin(2\theta)]$$

$$Y = d/4[1 - \cos(2\theta)]$$

Figure 4:
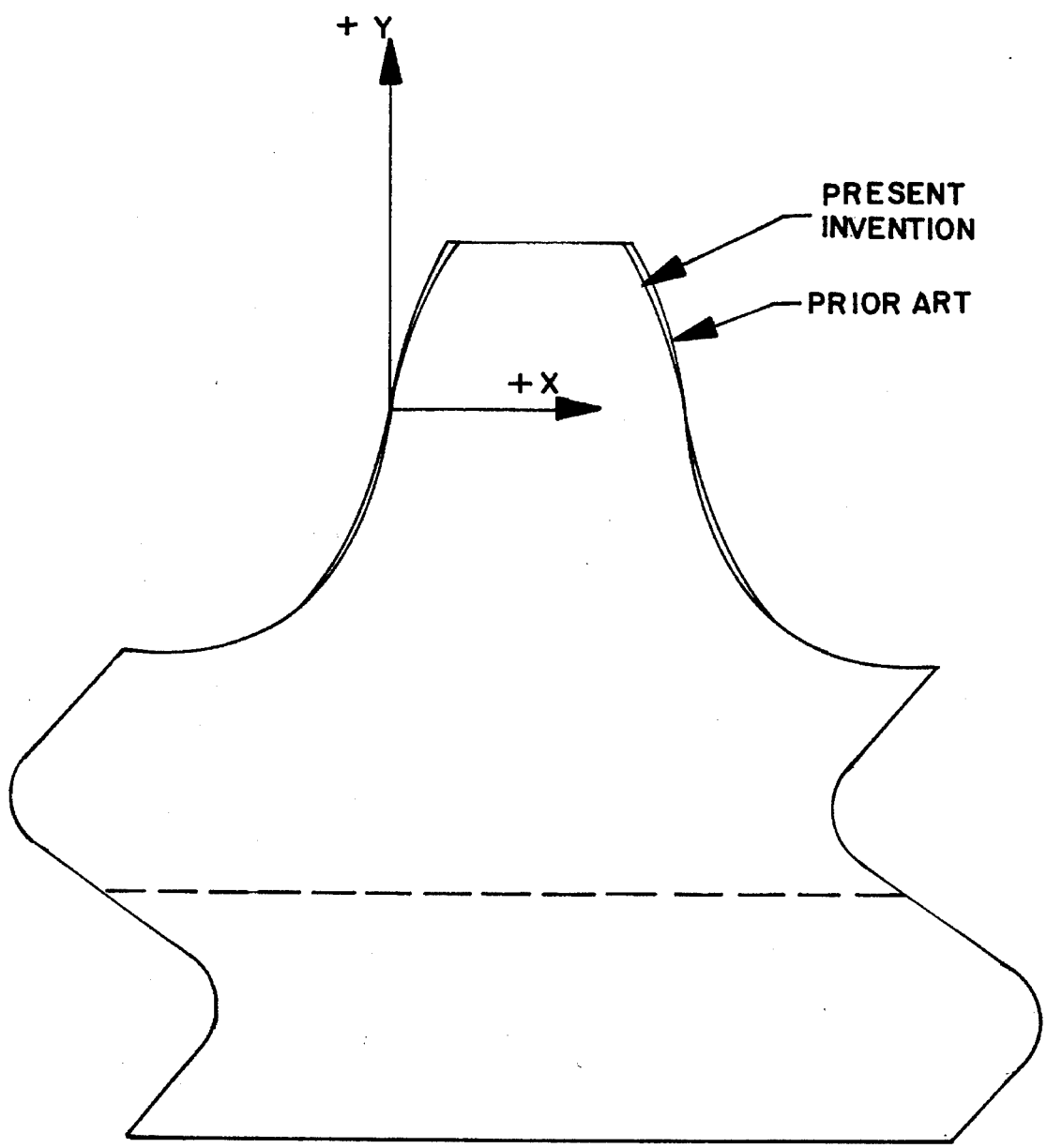
FIG. 4 is a comparison of the tooth profile of the present invention with that of the prior art.

Inclination of the flexspline tooth will cause mechanical interference with the adjacent circular spline tooth. The interference can be corrected by removing material from the tooth profile, in the tangential direction, of the amount of the arc segment "$h(\theta)\mu(\theta)$". Half of this amount is removed as by etching, machining or the like from the respective teeth 30 and 32 of the flexspline 26 profile and the other half from the circular spline 28 tooth profile. Thus the new equations for tooth profile are:

$$X = d/8[2\theta - \sin(2\theta)] + \tfrac{1}{2}[h(\theta)\mu(\theta)]$$

$$Y = d/4[1 - \cos(2\theta)]$$

where X is the tangential direction and Y is the radial direction, of the tooth addendum, as shown in FIG. 4. The dedendum is obtained by anti-symetric reflection about the pitch diameter.

That is, the tooth profile thus corrected to eliminate such interference. Such corrected profile is shown in FIG. 4 which shows the tooth profile of the present invention P.I., compared with the tooth profile of the prior art P.A.

It is to be noted that an oval wave generator is described for oval flexing of the flexspline to obtain a mesh between the internal and external gear teeth at two lobes. This type of harmonic drive speed reducer tooth profile arrangement of the present invention is also applicable to wave generators having more than two lobes, such as three or four.

I claim:

1. An extended contact harmonic drive gearing apparatus for transmitting rotary motion from an input drive to an output drive, comprising:

a rigid circular spline having gear teeth thereon;

a flexible flexspline having gear teeth thereon arranged radially adjacent said rigid circular spline;

a non-circular wave generator having a major axis and a minor axis arranged radially adjacent said circular spline, and adapted to deform said flexspline when rotated, to generate a rotative motion between the flexspline and the circular spline;

said flexspline, in conformance with said wave generator, having a minor axis thereacross with maximum radial separation between said gear teeth of said flexspline and said circular spline;

said flexspline, in conformance with said generator, having a major axis thereacross with a maximum engagement between said gear teeth of said flexspline and said circular spline;

said gear teeth on said flexspline having a precessing inclination and back again as they pass from the minor axis to the major axis thereon with respect to the wave generator rotatively arranged therewithin; and said gear teeth on said flexspline and said circular spline having a tooth profile which accommodates tooth inclination so as to avoid interference therebetween wherein said tooth profile is defined by the equations:

$$X = d/8[2\upsilon - \sin(2\upsilon)] + \tfrac{1}{2}\{\mu(\upsilon) \times h(\upsilon)\}$$

and $$Y = d/4[1 - \cos(2\upsilon)];$$

and "d" is defined as the amplitude of the deflection of the wave generator; "$\upsilon$" is defined as the rotation angle of the wave generator; "$\mu$" is the tooth inclination angle in radians, and "h" is defined as the contact height, and where X and Y are coordinates thereof.

2. A harmonic drive gearing apparatus for transmitting rotary motion from an input drive to an output drive, comprising:

a rigid circular spline;

a flexible flexspline arranged radially adjacent said circular spline;

a wave generator arranged radially adjacent said circular spline adapted to deform said flexspline when rotated, to generate a rotative motion between the flexspline and the circular spline, each of said flexspline and said circular spline having a tooth profile which accommodates tooth inclination of up to about 2 degrees to eliminate tooth interference between enmeshed engaged flexspline and circular spline teeth on a harmonic drive apparatus wherein said tooth profile is defined by the equations:

$$X = d/8[2\upsilon - \sin(2\upsilon)] + \tfrac{1}{2}\{\mu(\upsilon) \times h(\upsilon)\}$$

and $$Y = d/4[1 - \cos(2\upsilon)],$$

and wherein "d" is defined as the amplitude of the deflection of the wave generator; "$\upsilon$" is defined as the rotation angle of the wave generator; "$\mu$" is the tooth inclination angle in radians, and "h" is defined as the contact height.

* * * * *